July 17, 1962  H. T. LEVY  3,044,674
COMBINATION GARMENT HANGER MEANS SUPPORT AND REAR
WINDOW LEDGE SAFETY BARRIER FOR
AN AUTOMOBILE OR THE LIKE
Filed Aug. 21, 1956
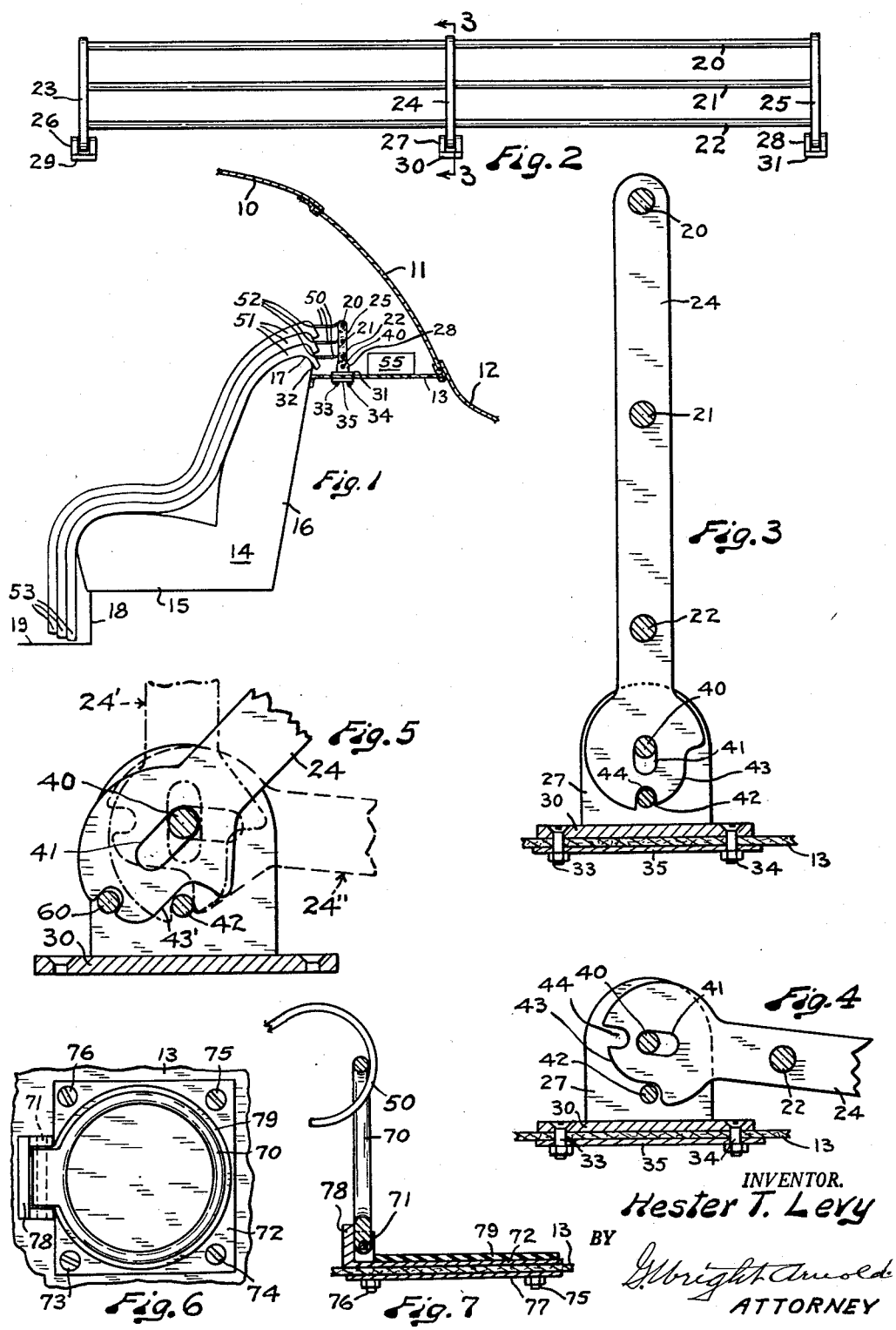
INVENTOR.
Hester T. Levy
BY
G. Bright Arnold
ATTORNEY United States Patent Office 3,044,674
Patented July 17, 1962

3,044,674
COMBINATION GARMENT HANGER MEANS SUPPORT AND REAR WINDOW LEDGE SAFETY BARRIER FOR AN AUTOMOBILE OR THE LIKE
Hester T. Levy, 125 E. 8th St., Port Angeles, Wash.
Filed Aug. 21, 1956, Ser. No. 605,292
2 Claims. (Cl. 224—42.34)

This invention relates to improvements in accessories of the type serving as a supporting member for garment hangers and more particularly relates to such an accessory mounted in the rear window shelf area of an automobile or the like, certain forms thereof also serving as a rear window shelf safety barrier.

Garment bag or garment hanger supporting and retaining devices employed in automobiles or the like customarily extend between and/or are supported by the windows of the rear doors or the adjacent frame in the automobile passenger compartment, often necessitating the folding or wrinkling of that portion of the garments touching the floor of the automobile. Further, the vision of the driver and other occupants of the automobile to the rear and sides thereof is materially impaired, either by the garments themselves or by the garment hanger supporting device, or both. Often the hanger support is permanently installed in the vehicle and as such presents an obstruction to full visibility and occupancy of a part of the passenger compartment, whether in use or not.

The problem of supporting hung garments in a vehicle during travel without disarranging the garments and without interfering with the visibility of the driver or other passengers has long presented considerable difficulty, since heretofore long garments must be folded or crumpled and the supporting member either remained more or less as an obstruction to visibility or must be removed when not in use.

Certain prior garment hanger supporting accessories drape one or more hung garments along the contour of the rear seat, as evidenced by the supporting members disclosed in Storey U.S. Patent 2,526,095, Batzle U.S. Patent 2,583,806, and Funk U.S. Patent 2,717,110. The first of these devices is of the type which is permanently installed on the rear window shelf of an automobile and as such remains as an obstruction to visibility when not in use. The latter two devices are arranged in a generally similar manner and must be physically removed from their garment supporting location or will likewise impair occupant visibility whether in use or not. Further, these prior hanger supports all place the garment hanger hook or hooks forwardly of the seat rear edge and, since the contour dimension of the seat from the rear edge to the floor of the vehicle is relatively restricted, the lower ends of relatively long garments become crumpled. Further, none of these prior devices has a substantial transverse dimension and as such cannot effectively serve as a rear window shelf safety barrier to retain loose articles on said shelf against flying into the seat areas of the automobile in the event the automobile is involved in an accident.

Objects of the present invention include overcoming these disadvantages by the presentation of a combination garment hanger support and rear window shelf barrier for an automobile or the like. More specifically, the present invention provides a garment hanger support, permanently securable to the rear window shelf of an automobile or the like, without presenting any obstruction to visibility when not in use, yet immediately available for use at all times. The garment hanger support according to the present invention further provides in certain forms thereof a bracket extending a substantial dimension transversely of an automobile or the like to form an effective rear window shelf barrier retaining loose articles on said shelf in the event the automobile is involved in an impact accident.

Yet another object of the present invention is to provide a garment hanger support mountable on the rear window shelf of an automobile or the like in a position rearwardly of the adjacent seat rear edge a sufficient distance to permit relatively long garments supported thereon to drape along the contour of said seat without crumpling of the lower ends thereof on the floor of such vehicle.

Still another object of the present invention is to provide a combination garment hanger rack and rear window shelf barrier which can readily be installed permanently in virtually any vehicle having a rear window shelf.

Yet another object of the present invention is to provide a combination garment hanger support and rear window shelf barrier which is pivotally mountable on the rear window ledge of an automobile or the like, so as to be completely removed from the line of vision of the occupants and not interfere with the occupancy of the passenger compartment when not in use, and so as to present only minimal dimensions to the line of vision through the rear window when in use.

It is yet another object of the present invention to provide an accessory of the garment hanger retaining type, mountable on the rear window shelf of an automobile or the like, wherein in one form the hanger hook contacting portion of the accessory is pivotable from a generally horizontal position below the level of and behind the crown of the seat back portion to a locked, substantially vertical, upstanding position for use in the manner indicated. In general the hanger hook contacting portion may take two forms, one having bars extending across the full width of the shelf and a second form that of a ring-like member. A related object is to present a modified form of such accessory, wherein the hanger hook contacting portion can also be locked in a third position extending generally at an acute angle upwardly and rearwardly from the rear window shelf.

These and other objects of the present invention will be apparent from the following description and accompanying illustration of typical embodiments thereof, set forth by way of example and not limitation, wherein like reference numerals designate like parts and wherein:

FIGURE 1 is a fragmentary longitudinal sectional view, partly in elevation, of an automobile body incorporating a combination garment hanger retaining member and rear window shelf barrier according to the present invention, such accessory being shown with the pivotally mounted elements thereof in a substantially vertical position.

FIG. 2 is a detached view in side elevation of the combination garment hanger supporting member and rear window shelf barrier shown in FIGURE 1.

FIG. 3 is a cross sectional view taken substantially along line 3—3 of FIG. 2, showing detail of the mounting structure and locking means for one of the pivotal arms of the accessory shown in FIGURES 1 and 2, and showing a fragment of the rear window shelf to which the base plate thereof is attached.

FIG. 4 is a fragmentary cross sectional view, corresponding to the view of FIG. 3, illustrating one of the pivotally mounted arms in the generally horizontal or reclining position in which the same are placed when not in use.

FIG. 5 is a detached, fragmentary view, generally corresponding to the views of FIGS. 3 and 4, but presenting a modified form of pivoted arm mounting and locking arrangement, by means of which the pivoted arm can be locked in a substantially vertical position, or in a locked, oblique position, or in a reclining, substantially horizontal position, as desired.

FIG. 6 presents a top view of a further modified and simplified form of pivoted garment hanger retaining member, showing the garment hanger hook receiving a pivoted element thereof in reclining position, and showing a fragment of the rear window shelf to which the same is attached.

FIG. 7 is a vertical cross sectional view taken through the longitudinal center of the modified retaining member illustrated in FIG. 6, showing the hanger hook receiving element in an upright position and further illustrating the manner of attachment thereof to the rear window shelf of an automobile.

It will be readily understood that the present invention is not limited in its application to the typical constructional details and arrangement of parts presented but is capable of other embodiments and forms, within the scope of the appended claims.

Specifically considering the illustrative form of the invention presented in FIGURES 1 through 4, FIGURE 1 presents in longitudinal cross section a fragmentary portion of a vehicle body showing the rear portion of the passenger compartment thereof including roof panel 10, rear window 11, rear panel 12, rear window shelf 13, rear seat 14, base panel 18 and floor member 19, said rear seat 14 comprising seat portion 15 and back portion 16 having a crown 17 extending above the level of said rear window shelf 13.

According to one form of the present invention, as illustrated in FIGURES 1 through 4, an accessory serving as a combination garment hanger support and safety barrier, which support may also be termed a garment hanger support connector member, is provided on rear window shelf 13 of the vehicle, such accessory comprising at least one substantially horizontally arranged rod, three such rods being indicated at 20, 21 and 22 by way of illustration. Such rod or rods are mounted on a plurality of pivoted arms, three being indicated at 23, 24 and 25, also by way of illustration. Each said arm 23, 24 or 25 is selectively pivotable on respective base members 26, 27 and 28. Said base members 26, 27 and 28 in turn each includes a pedestal portion, respectively indicated at 29, 30 and 31, mountable on rear window shelf 13 by suitable means such as bolts 33 and 34 and face plate 35 (see FIGS. 1, 3 and 4). As shown in FIGURE 1, the accessory of the present invention is advantageously mounted transversely of the rear window shelf 13 about three inches behind the rear edge 32 of seat 14, as more fully discussed hereinafter.

The specific typical pivotal mounting of arms 23, 24 and 25 on respective base members 26, 27 and 28, central arm 24 and central base member 27 being selected for purposes of the detailed illustrations of FIGS. 3 and 4, includes pivot pin 40 mounted in said base member 27 and cooperating with slot means 41 provided in the attached end of said arm 24. Said slot means 41 permits the arms 23, 24 and 25 to be manually raised from the reclining substantially horizontal position of non-use shown in FIG. 4 to the substantially upright position of use shown in FIG. 3 by simply manually raising said arms 23, 24 and 25 and said rods 20, 21 and 22 connected therebetween as a unit to a substantially upright position, off-center locking pin 42, also mounted in base member 27, sliding along recessed curved surface 43 formed in the base portion of pivoted arm 24 until a substantially upright position is reached, whereupon said slot 41 permits off-center locking pin 42 to nest in cutout portion 44 of arm 24 and lock said arm in its upright position for use in the manner indicated.

It will be apparent that such pivotal linkage elements as are illustrated in FIGS. 3 and 4 may be termed a lost-motion pivot means, and that such elements readily permit unlocking of said arm 24, for example, from an upright position merely by manually raising the same until pin 42 clears cutout portion 44, whereupon said arm 24 can be manually pivoted to return the same to a substantially horizontal position.

Having considered in detail one typical form of the subject accessory, as presented in connection with the form of the invention shown in FIGURES 1 through 4, it will be evident that a plurality of garment hanger means, such as garment bag hooks 50, can engage one or more rods 20, 21 and 22 and/or uprights 23, 24 and 25, three such hooks 50 being shown in engagement with rods 20, 21 and 22 in FIG. 1. Hooks 50, as will be evident, can be the hanger means for garment bags 51, or can be the hooks of garment hangers of the conventional type shown in the aforementioned Funk U.S. Patent 2,717,110, as desired. When garment bags 51, for example, are so mounted with hooks 50 thereof in engagement with rods 20, 21 and 22, as shown in FIGURE 1, the spacing of such garment bag hook supporting rods a substantial distance to the rear of the rear edge 32 of seat 14 permits the upper, usually stiff surfaces 52 of garment bags 51 to nest one on top of the other, generally in the manner also shown in FIGURE 1, thereby effectively minimizing the obstruction to vision through rear window 11 presented by the plurality of garment bags 51. Additionally, said garment bags 51 are effectively anchored against relative movement when the vehicle is in motion. Also, while it is to be understood that the lengths of long garments and garment bags vary somewhat in practice, with garment bag hooks 50 extending substantially behind seat rear edge 32, the lower ends 53 of garment bags 51 in virtually all instances clear floor 19 of the vehicle when said garment bags are arranged generally in the maner shown in FIGURE 1 to follow the contour of seat 14.

The garment bag support accessory of FIGURES 1 through 4, when arranged in the manner indicated, additionally or alternatively functions as a safety barrier for loose articles on rear window shelf 13 of the vehicle, one such loose article being indicated for purposes of illustration at 55. Such anchoring of loose articles on the rear window shelf is of material importance from a safety point of view since accident research in recent years has established that, to a substantial extent, the injury resulting from an impact accident is often occasioned by loose articles flying from the rear window shelf through the passenger compartment and striking the passengers in the vehicle. The possibility of such contingency happening is minimized by the safety barrier function of the present invention.

Another advantage of the combination garment hanger support and rear window shelf safety barrier here presented is that even when in use the dimensions of rods 20, 21 and 22 and arms 23, 24 and 25 transversely of the line of vision through the rear window 11 are small and obstruction to vision resulting therefrom is minimal. Thus, in a typical installation, rods 20, 21 and 22 are approximately half inch in diameter, pivot arms 23, 24 and 25 are about four inches long and about one-half inch thick and when upright extend from two to three inches above the crown 17 of seat 14 depending upon the level thereof above rear window shelf 13 in a given vehicle. Obviously, such dimensions of rods 20, 21 and 22 and arms 23, 24 and 25 transverse to the line of vision can be further reduced and varied as desired, consistent with desired strength requirements. Further, rather than being substantially circular in cross section, rods 20, 21 and 22 may be flattened transversely and elongated in the direction of the line of vision.

Other variations in the elemental arrangement of the pivotal mounting of ams 23, 24 and 25 on respective base members 26, 27 and 28 will readily occur to those skilled in the art, and FIG. 5 presents a modified form thereof having means whereby a pivoted arm, 24 again being selected by way of example, can be locked in either a substantially vertical position, an oblique position extending rearwardly and upwardly from the rear window shelf, or can be dropped to a reclining, substantially horizontal position resting on the rear window shelf. Such positions are respectively shown in FIG. 5 by dotted line at 24′, by solid line at 24 and by dotted line at 24″. As in the form of the pivotal mounting presented in detail in FIGS. 3 and 4, the pivotal mounting of FIG. 5 includes central pivot pin 40, slot 41 and off-center locking pin 42, and in addition is provided with a second off-center locking pin 60 to lock the arm 24 in the oblique position, the lower cut-away portion of arm 24 being recessed to a somewhat greater extent, as indicated at 43′, to permit slot 41 to engage pin 60 in such latter position. It will be readily understood that the manipulation of arm 24 in the form of the invention presented in FIG. 5 is essentially the same as involved in the form of the pivotal mounting presented in FIGS. 3 and 4, slot 41 permitting the arm 24 to be raised from a locked position with respect to either off-center locking pin 42 or off-center locking pin 60, as appropriate.

The oblique position shown in solid line in the modified form of the invention shown at FIG. 5 is particularly advantageous from two points of view. First, with respect to the arrangement of garment bags or the like on the hanger support, should garment bags 51 in FIGURE 1, for example, be unusually long so as to slightly touch floor 19 of the vehicle at the lower ends 53 thereof, an extra few inches of hanging length can be obtained by placement of pivoted arms 23, 24 and 25 in the oblique, rearwardly and upwardly extending position, it being evident that such oblique position on occasion further facilitates nesting of garment bag upper surfaces 52, depending upon the specific dimensions and construction of the garment bags 51 hung thereon. Secondly, with respect to the rear window shelf safety barrier function of the accessory of the present invention, such oblique position as shown in solid line in FIG. 5 effectively forms a pocket adjacent to and extending along the forward edge of rear window shelf 13. Loose articles, such as the article indicated at 55 in FIGURE 1, will positively nest in and be trapped by such pocket, even more so than when the arms of the accessory are substantially vertical. Thus, the flexibility of the accessory and efficiency of the bracket of the present invention is further implemented as to both its functions by use of the modified form of pivotal mounting presented in FIG. 5.

In the forms of the invention illustrated in FIGURES 1 through 5, i.e. where a plurality of pivoted upright arms are joined by one or more connecting rods or the like, and where the rear window shelf of a given vehicle arcs substantially in the transverse dimension, it will be readily understood that the mounting elements for the respective base members of the accessory can be substantially aligned as by placement of one or more suitable spacer blocks, which advantageously can be identical in construction with face plates 35, between the end base members and the rear window shelf to arrange the mounting so that the connecting rods between the pivoted arms are in a substantially straight line whether said arms are in an upright or substantially horizontal position. Such result can also be achieved by recessing one or more of the base members, such as the central base member 27 of FIG. 2, into a cutout portion of the rear window shelf, as necessary.

FIGS. 6 and 7 respectively present top and vertical cross sectional views of a further modified and simplified form of pivoted garment hanger support according to the present invention, together with a fragment of the rear window shelf on which one or more of the same are mounted. In this form of the invention, which may be used individually or in plurality on a given rear window shelf 13, as desired, a garment hanger support connector member, as for illustration, in the form of a hanger ring 70 is pivotally mounted by pin 71 to base plate 72, base plate 72 in turn being attached to rear window shelf 13 by suitable means such as bolts 73, 74, 75 and 76 and face plate 77. Thus, the garment hanger support connector member may take form of the fence or bar construction shown in FIG. 2 or the form of the ring or ringlike member shown in FIGS. 6 and 7. Base plate 72 is provided in its forward portion with an upstanding ledge 78 against which hanger ring 70 rests when in an upright position. Base plate 72 also has attached thereto by adhesive or the like a resilient pad 79 serving to keep hanger ring 70 from rattling when in the reclined or non-use position shown in FIG. 6.

As in the forms of the invention earlier described, the modified and simplified form of garment hanger support illustrated in FIGS. 6 and 7 is advantageously mounted on the rear window shelf substantially to the rear of the read edge of the adjacent seat back. A spacing of about three inches from the forward edge of the rear window shelf has been determined as preferred in this regard.

From the foregoing consideration of the form of the invention having a pivotally mounted independent garment hanger or garment bag hook retaining element, as presented in FIGS. 6 and 7, it will be evident that such type of accessory is adapted to arrangement in plurality on the rear window shelf in any desired pattern. Thus, several such accessories can be arranged in a transverse line to the rear of the seat crown and each can be in an upright position for engagement with a garment carrying hook, or lowered when not in use, as desired. When so arranged, that is in a transverse line along the rear window shelf, such plurality of independent garment hook retaining means, when all raised to operative position, can also serve as a safety barrier for certain types of loose articles arranged on the rear window shelf, such as an umbrella or the like, even though such hook engaging and retaining means are separately and independently movable.

It will be additionally evident that, although the forms of the invention presented are accessories of the type designed for installation in a vehicle in the field, such are readily adaptable to installation in a vehicle at the time of manufacture thereof. Thus, considering the first form of the invention, for example, an entire area of the rear window shelf of the vehicle coextensive with the area of the pivoted arms and connecting rods can be recessed to permit the whole accessory to be placed in a position of non-use at or below the level of the rear window shelf.

Various other forms and modifications of the present invention will be apparent to those skilled in the art, in the light of the foregoing description of typical forms thereof, within the scope of the following claims.

What is claimed is:

1. A garment hanger device disposed in a passenger automobile comprising an automobile rear window shelf; an upholstered back of an automobile rear seat with its top crown rising above said shelf leaving said window with an area open to view above the level of said crown; garment hanger base members secured to said shelf back of, below, and in spaced relation to said top crown; arms pivotally mounted on said base members adapted to taking a prone position resting upon said shelf below, behind, and in spaced relation to said crown and having locking means which may maintain said arms in a locked, substantially erect or in a locked, substantially oblique position; said locking means carried by at least one of said base members and said arms and comprising a mounting pin carried by one of said base members on which pin one of said arms is swingingly mounted by a longitudinally disposed receiving slot in said arm, a first off-center locking pin disposed substantially vertically below said pivot pin, a notch cut in the peripheral end portion of said arm in which said off-center pin may be engaged in locking the arm in erect position, a second off-center locking pin mounted on said base member which is engaged by said notch when said arm is in oblique position in providing for full length garment support above the automobile floor when said garment is draped over the seat and crown of the rear seat, a curved portion cut out of said peripheral end portion of said arm extending from said notch backwardly providing clearance for said first off-center pin when said arm is in prone position; horizontal rod means mounted on said pivot arms, said rod means being engageable by a garment hanger hook, the shank of said hook being adapted to be held in substantially horizontal position in draping the top portion of a garment downwardly about the said top crown in causing the configuration of the seat and the seat back in cooperation with said crown to be employed as full length garment supports avoiding wrinkling said garment and in providing for the top portion of the garment to be held downwardly over said crown to minimize the obstruction of the view from the rear window.

2. A garment hanger device disposed in a passenger automobile comprising an automobile rear window shelf; an upholstered back of an automobile rear seat with its crown rising above said shelf leaving the window with an area open to view above the level of said crown; a base member secured to said shelf back of, below and in spaced relation to said crown; an arm pivotally mounted on said base member adapted to taking a prone position resting upon said shelf below, behind and in spaced relation to said crown; and cooperating locking means carried by said base member and said arm which selectively maintain said arm in a locked, substantially erect and a locked, substantially oblique position.

References Cited in the file of this patent

UNITED STATES PATENTS

| | | |
|---|---|---|
| 424,569 | Morrison | Apr. 1, 1890 |
| 1,377,997 | Klug | May 10, 1921 |
| 1,721,330 | Black | July 16, 1929 |
| 1,824,288 | Meyer | Sept. 22, 1931 |
| 1,946,633 | Meyer | Feb. 13, 1934 |
| 2,111,371 | Powers et al. | Mar. 15, 1938 |
| 2,196,196 | Dorsey | Apr. 9, 1940 |
| 2,500,881 | Stader | Mar. 14, 1950 |
| 2,550,172 | Swalwell | Apr. 24, 1951 |
| 2,582,650 | Patton | Jan. 15, 1952 |
| 2,640,634 | Francis | June 2, 1953 |
| 2,653,036 | Creel et al. | Sept. 22, 1953 |
| 2,721,680 | Steckman | Oct. 25, 1955 |

FOREIGN PATENTS

| | | |
|---|---|---|
| 532,784 | Italy | Sept. 1, 1955 |